US006374947B1

(12) United States Patent
Nurkiewicz

(10) Patent No.: US 6,374,947 B1
(45) Date of Patent: Apr. 23, 2002

(54) LADDER LEVELING DEVICE

(76) Inventor: Richard Nurkiewicz, 3148 Jeanette Ave., Park City, IL (US) 60085

( * ) Notice: Subject to any disclaimer, the term of this patent is extended or adjusted under 35 U.S.C. 154(b) by 0 days.

(21) Appl. No.: 09/844,591

(22) Filed: Apr. 27, 2001

(51) Int. Cl.$^{7}$ ............................ E06C 1/00; F16M 11/24

(52) U.S. Cl. ..................... 182/201; 182/200; 248/188.2

(58) Field of Search ................................ 182/200, 201, 182/202, 203, 204, 205, 214, 206, 107, 106, 108; 248/188.2, 188.3, 188.4, 188.5

(56) References Cited

U.S. PATENT DOCUMENTS 4,766,976 A * 8/1988 Wallick, Jr. ................. 182/201
4,807,720 A * 2/1989 Kim ........................... 182/205
4,984,655 A * 1/1991 Scherer et al. .............. 182/204
5,027,923 A * 7/1991 Derome ...................... 182/201
5,464,071 A * 11/1995 Rice et al. .................. 182/205
5,526,898 A * 6/1996 Clark ......................... 182/200
5,542,497 A * 8/1996 Macyszyn ................... 182/201
5,755,307 A * 5/1998 Dunnewin et al. .......... 182/202
5,845,744 A * 12/1998 Beck et al. ................. 182/204

* cited by examiner

*Primary Examiner*—Daniel P. Stodola
*Assistant Examiner*—Hugh B. Thompson
(74) *Attorney, Agent, or Firm*—Goldstein Law Offices, PLC

(57) ABSTRACT

A ladder leveling device including an upper block portion couplable with respect to a bottom of a ladder leg. The upper block portion has a generally rectangular configuration defined by a closed upper end, an open lower end, a front wall, a back wall and opposed side walls. The front wall has a longitudinal slot formed therein. A lower block portion is coupled with respect to the upper block portion. The lower block portion has a generally rectangular configuration defined by an upper end, a lower end, a front wall, a back wall and opposed side walls. The upper end is slidably received within the open lower end of the upper block portion. The front wall has a bolt extending outwardly therefrom for being positioned within the longitudinal slot of the upper block portion whereupon a nut can be tightened on the bolt to fix a height of the upper block portion with respect to the lower block portion. A glass bubble level is provided that can be secured to the leg of the ladder above the upper block portion.

7 Claims, 3 Drawing Sheets

LADDER LEVELING DEVICE

BACKGROUND OF THE INVENTION

The present invention relates to a ladder leveling device and more particularly pertains to equalizing the legs of a ladder on uneven ground to facilitate safe use of the ladder.

The use of ladder devices is known in the prior art. More specifically, ladder devices heretofore devised and utilized for the purpose of adjusting legs thereof for varied use are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,861,500 to Dempsey discloses a ladder with a level incorporated and adjustable legs for positioning on uneven terrain. U.S. Pat. No. 4,073,367 to Wright discloses a ladder with a clutch assembly and spring for adjusting the legs to a level position. U.S. Pat. No. 5,265,698 to Friedel, Jr. discloses a self leveling step ladder.

While these devices fulfill their respective, particular objective and requirements, the aforementioned patents do not describe a ladder leveling device for equalizing the legs of a ladder on uneven ground to facilitate safe use of the ladder.

In this respect, the ladder leveling device according to the present invention substantially departs from the conventional concepts and designs of the prior art, and in doing so provides an apparatus primarily developed for the purpose of equalizing the legs of a ladder on uneven ground to facilitate safe use of the ladder.

Therefore, it can be appreciated that there exists a continuing need for a new and improved ladder leveling device which can be used for equalizing the legs of a ladder on uneven ground to facilitate safe use of the ladder. In this regard, the present invention substantially fulfills this need.

SUMMARY OF THE INVENTION

In the view of the foregoing disadvantages inherent in the known types of ladder devices now present in the prior art, the present invention provides an improved ladder leveling device. As such, the general purpose of the present invention, which will be described subsequently in greater detail, is to provide a new and improved ladder leveling device which has all the advantages of the prior art and none of the disadvantages.

To attain this, the present invention essentially comprises an upper block portion couplable with respect to a bottom of a ladder leg. The upper block portion has a generally rectangular configuration defined by a closed upper end, an open lower end, a front wall, a back wall and opposed side walls. One of the opposed side walls has a plate extending laterally therefrom adjacent to the open lower end. The plate allows the bottom of the ladder leg to rest thereon. The front and back walls each have a support arm extending outwardly therefrom disposed above the plate. The supports receive the ladder leg therebetween when positioned on the plate. The front wall has a longitudinal slot formed therein. A lower block portion is coupled with respect to the upper block portion. The lower block portion has a generally rectangular configuration defined by an upper end, a lower end, a front wall, a back wall and opposed side walls. The upper end is slidably received within the open lower end of the upper block portion. The upper end has a plurality of springs extending upwardly therefrom. The lower end has a rubber gasket positioned thereon. The opposed side walls each have a pair of roller bearings disposed therein. The front wall has a bolt extending outwardly therefrom for being positioned within the longitudinal slot of the upper block portion whereupon a nut can be tightened on the bolt to fix a height of the upper block portion with respect to the lower block portion. A glass bubble level is provided that can be secured to the leg of the ladder above the upper block portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ladder leveling device which has all the advantages of the prior art ladder devices and none of the disadvantages.

It is another object of the present invention to provide a new and improved ladder leveling device which may be easily and fib efficiently manufactured and marketed.

It is a further object of the present invention to provide a new and improved ladder leveling device which is of durable and reliable construction.

An even further object of the present invention is to provide a new and improved ladder leveling device which is susceptible of a low cost of manufacture with regard to both materials and labor, and which accordingly is then susceptible of low prices of sale to the consuming public, thereby making such a ladder leveling device economically available to the buying public.

Even still another object of the present invention is to provide a new and improved ladder leveling device for equalizing the legs of a ladder on uneven ground to facilitate safe use of the ladder.

Lastly, it is an object of the present invention to provide a new and improved ladder leveling device including an upper block portion couplable with respect to a bottom of a ladder leg. The upper block portion has a generally rectangular configuration defined by a closed upper end, an open lower end, a front wall, a back wall and opposed side walls. The front wall has a longitudinal slot formed therein. A lower block portion is coupled with respect to the upper block portion. The lower block portion has a generally rectangular configuration defined by an upper end, a lower end, a front wall, a back wall and opposed side walls. The upper end is slidably received within the open lower end of the upper block portion. The front wall has a bolt extending outwardly therefrom for being positioned within the longitudinal slot of the upper block portion whereupon a nut can be tightened on the bolt to fix a height of the upper block portion with respect to the lower block portion. A glass bubble level is provided that can be secured to the leg of the ladder above the upper block portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
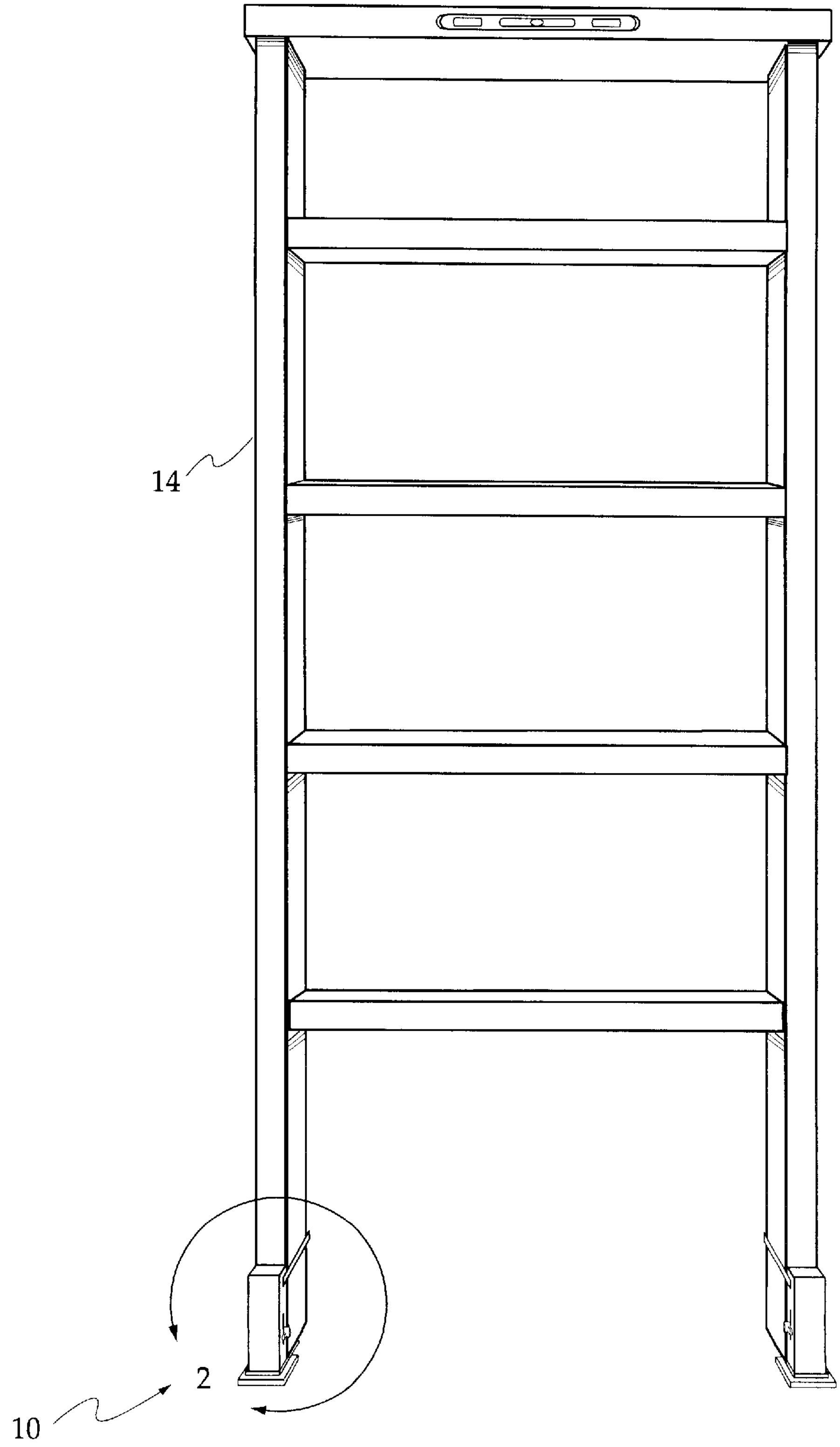
FIG. 1 is a perspective view of the preferred embodiment of the ladder leveling device constructed in accordance with the principles of the present invention.
Figure 3:
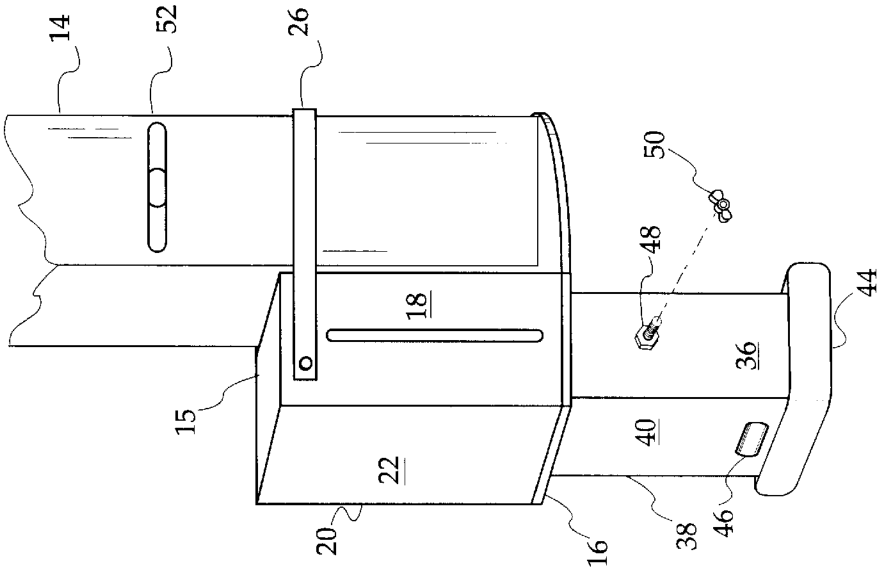
FIGS. 3 and 4 are perspective views of the present invention illustrated in use.
Figure 2:
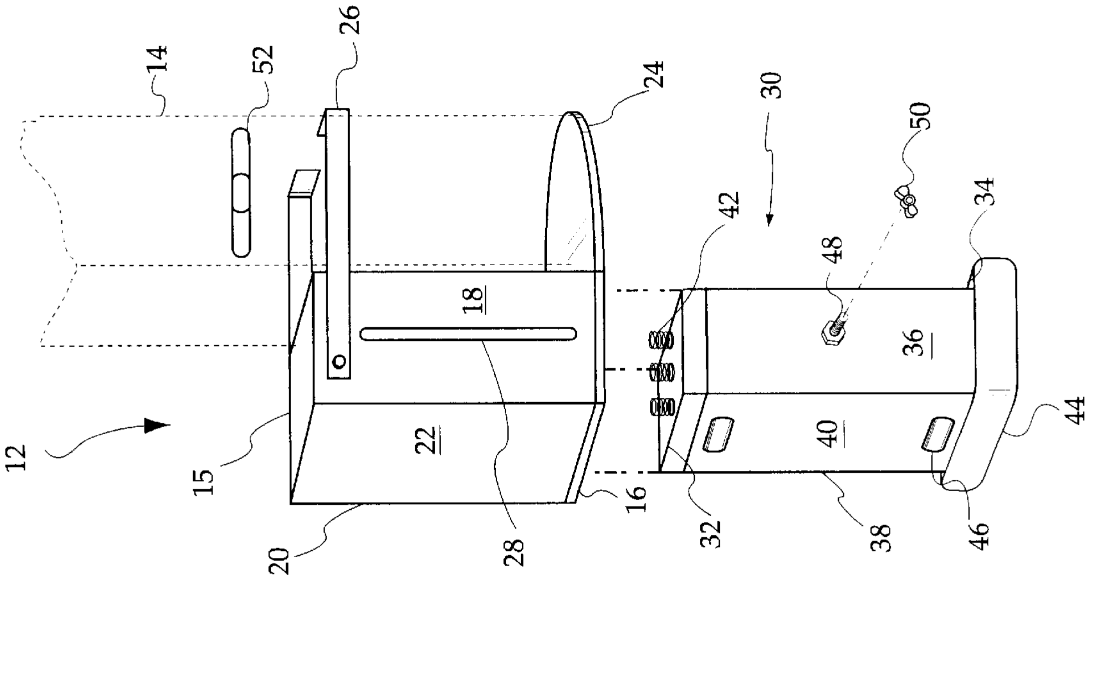
FIG. 2 is an exploded perspective view of the present invention as illustrated being secured to a ladder leg.
Figure 4:
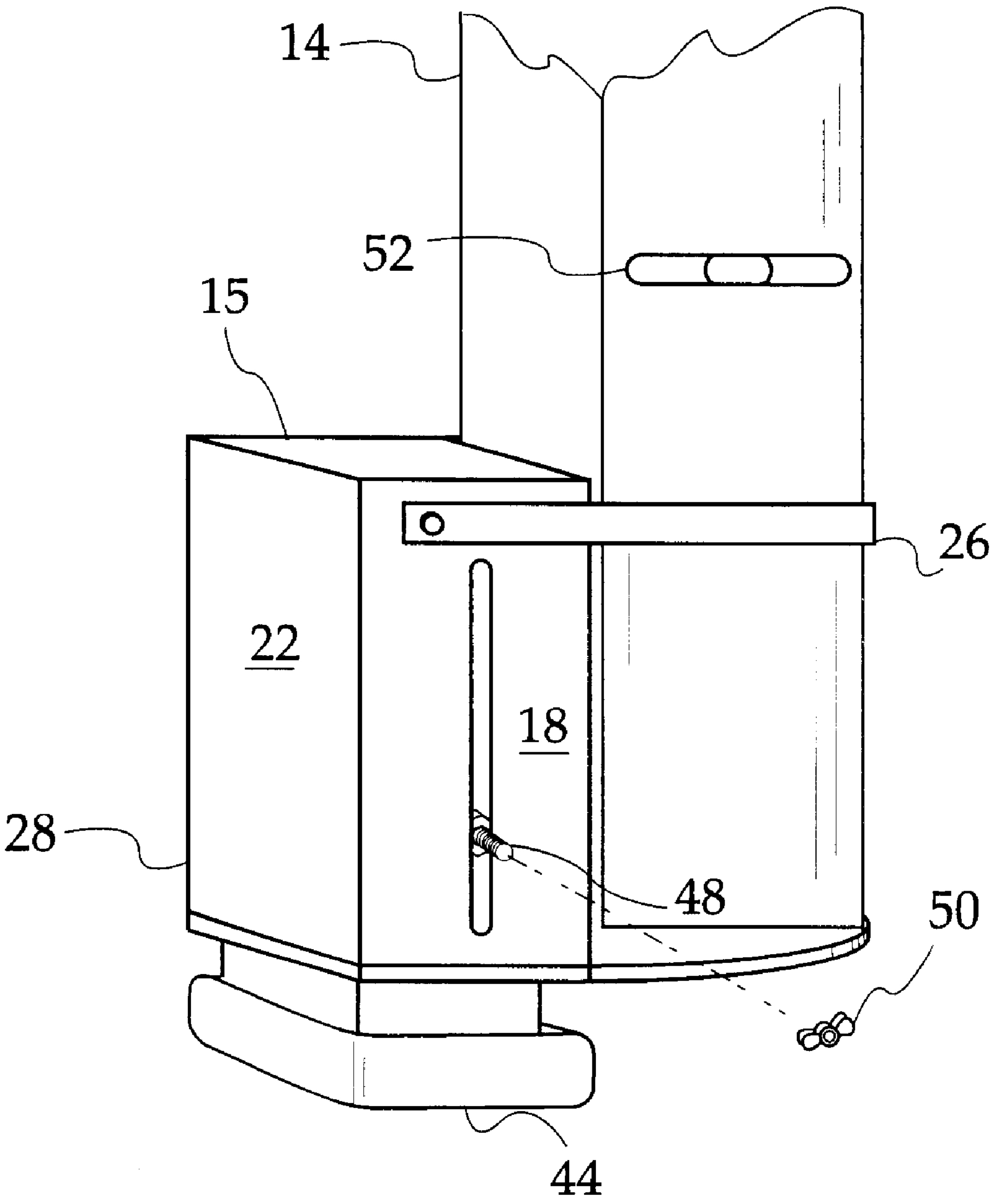

With reference now to the drawings, and in particular, to FIGS. 1 through 4 thereof, the preferred embodiment of the new and improved ladder leveling device embodying the principles and concepts of the present invention and generally designated by the reference number 10 will be described.

Specifically, it will be noted in the various Figures that the device relates to a ladder leveling device for equalizing the legs of a ladder on uneven ground to facilitate safe use of the ladder. In its broadest context, the device consists of an upper block portion, a lower block portion and a glass bubble level. Such components are individually configured and correlated with respect to each other so as to attain the desired objective.

The upper block portion 12 is couplable with respect to a bottom of a ladder leg 14. The upper block portion 12 has a generally rectangular configuration defined by a closed upper end 15, an open lower end 16, a front wall 18, a back wall 20 and opposed side walls 22. One of the opposed side walls 22 has a plate 24 extending laterally therefrom adjacent to the open lower end 16. The plate 24 allows the bottom of the ladder leg 14 to rest thereon. The front and back walls 18,20 each have a support arm 26 extending outwardly therefrom disposed above the plate 24. The supports 26 receive the ladder leg 14 therebetween when positioned on the plate 24. The front wall 18 has a longitudinal slot 28 formed therein.

The lower block portion 30 is coupled with respect to the upper block portion 12. The lower block portion 30 has a generally rectangular configuration defined by an upper end 32, a lower end 34, a front wall 36, a back wall 38 and opposed side walls 40. The upper end 32 is slidably received within the open lower end 16 of the upper block portion 12. The upper end 32 has a plurality of springs 42 extending upwardly therefrom. The springs 42 will provide a buffer between the upper and lower block portions 12, 30. The lower end 34 has a rubber gasket 44 positioned thereon. The rubber gasket 44 will help the lower block portion 30 position itself on a recipient surface. The opposed side walls 40 each have a pair of roller bearings 46 disposed therein. The roller bearings 46 allow the upper block portion 12 to smoothly slide with respect to the lower block portion 30. The front wall 36 has a bolt 48 extending outwardly therefrom for being positioned within the longitudinal slot 28 of the upper block portion 12 whereupon a nut 50 can be tightened on the bolt 48 to fix a height of the upper block portion 12 with respect to the lower block portion 30.

The glass bubble level 52 can be secured to the leg 14 of the ladder above the upper block portion 12. The glass bubble level 52 can be viewed to make sure the ladder is evenly placed on the recipient surface. The user will look at the glass bubble level 52 while they adjust the upper and lower block portions 12, 30 with respect to the leg 14 of the ladder. It should be noted that the present invention can be positioned on each of the legs of the ladder if needed and independently adjusted to level the ladder with respect to the recipient surface.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A ladder leveling device in combination with a ladder, for equalizing legs of a ladder on uneven ground to facilitate safe use of the ladder comprising, in combination:

an upper block portion couplable with respect to a bottom of one of said legs, the upper block portion having a generally rectangular configuration defined by a closed upper end, an open lower end, a front wall, a back wall and opposed side walls, one of the opposed side walls having a plate extending laterally therefrom adjacent to the open lower end, the plate allowing the bottom of one of said ladder legs to rest thereon, the front and back walls each having a support arm extending outwardly therefrom disposed above the plate, the support arms receiving the ladder leg therebetween when positioned on the plate, the front wall having a longitudinal slot formed therein;

a lower block portion coupled with respect to the upper block portion, the lower block portion having a generally rectangular configuration defined by an upper end, a lower end, a front wall, a back wall and opposed side walls, the upper end being slidably received within the open lower end of the upper block portion, the upper end of the lower block portion having a plurality of springs extending upwardly therefrom, the lower end of the lower block portion having a rubber gasket positioned thereon, the opposed side walls of the lower block portion each having a pair of roller bearings disposed therein, the front wall of the lower block portion having a bolt extending outwardly therefrom for being positioned within the longitudinal slot of the upper block portion whereupon a nut can be tightened on the bolt to fix a height of the upper block portion with respect to the lower block portion; and a glass bubble level securable to the leg of the ladder above the upper block portion.

2. A ladder leveling device in combination with a ladder, for equalizing legs of a ladder on uneven ground to facilitate safe use of the ladder comprising, in combination:

an upper block portion couplable with respect to a bottom of one of said legs, the upper block portion having a generally rectangular configuration defined by a closed upper end, an open lower end, a front wall, a back wall and opposed side walls, the front wall having a longitudinal slot formed therein;

a lower block portion coupled with respect to the upper block portion, the lower block portion having a generally rectangular configuration defined by an upper end, a lower end, a front wall, a back wall and opposed side walls, the upper end of the lower block portion being slidably received within the open lower end of the upper block portion, the front wall of the lower block portion having a bolt extending outwardly therefrom for being positioned within the longitudinal slot of the upper block portion whereupon a nut can be tightened on the bolt to fix a height of the upper block portion with respect to the lower block portion; and a glass bubble level securable to the leg of the ladder above the upper block portion.

3. The ladder leveling device as set forth in claim 2, wherein one of the opposed side walls of the upper block portion has a plate extending laterally therefrom adjacent to the open lower end, the plate allowing the bottom of the ladder leg to rest thereon.

4. The ladder leveling device as set forth in claim 3, wherein the front and back walls of the upper block portion each have a support arm extending outwardly therefrom disposed above the plate, the support arms receiving the ladder leg therebetween when positioned on the plate.

5. The ladder leveling device as set forth in claim 2, wherein the upper end of the lower block portion has a plurality of springs extending upwardly therefrom.

6. The ladder leveling device as set forth in claim 2, wherein the lower end of the lower block portion has a rubber gasket positioned thereon.

7. The ladder leveling device as set forth in claim 2, wherein the opposed side walls of the lower block portion each have a pair of roller bearings disposed therein.

* * * * *